Jan. 30, 1962     W. R. HAUSCH     3,019,148

LAMINATED ARTICLE, AND METHOD OF MAKING SAME

Filed Oct. 26, 1955

INVENTOR.
WALTER R. HAUSCH
BY W. A. Fraser
ATTY.

United States Patent Office 3,019,148
Patented Jan. 30, 1962

3,019,148
LAMINATED ARTICLE AND METHOD OF MAKING SAME
Walter R. Hausch, Akron, Ohio, assignor to The Firestone Tire & Rubber Company, Akron, Ohio, a corporation of Ohio
Filed Oct. 26, 1955, Ser. No. 542,849
9 Claims. (Cl. 154—48)

This invention relates to laminated products comprising diene rubber stocks adhered to stocks containing diisocyanate-chain-extended polyester rubbers, hereinafter designated, for brevity, diisocyanate-polyester rubbers.

It would be highly desirable to produce structures in which natural or synthetic diene rubber stocks are adhered to diisocyanate-polyester rubber stocks. For instance, tires having bodies of Hevea rubber and treads of diisocyanate-polyester rubber would combine the cheapness and general excellent properties (particularly in the cold) of Hevea rubber with the good resistance to abrasion, ozone, and aging of the diisocyanate-polyester rubbers. The diisocyanate-polyester rubbers likewise lend themselves to a wider range of colors, since good properties can be achieved without addition of carbon blacks, and moreover these rubbers have inherently lighter color. These last features would be particularly desirable in providing white or light-colored sidewalls or treads on tires. Heretofore, adhered structures of this type have not been possible, because the stocks would not adhere to each other during vulcanization, and because the curing agents (sulfur-accelerator systems for the diene rubbers; polyisocyanates for the diisocyanate-polyester rubbers) interfered with each other's action.

Accordingly, it is an object of this invention to provide structures in which stocks containing natural or synthetic rubbers are adhered to stocks containing diisocyanate-polyester rubbers.

Another object is to provide a process for producing such structures in which the curing agents for the several rubbers do not interfere with each other.

A further and more specific object is to provide a tire having a body of a diene rubber stock and a tread of a diisocyanate-polyester rubber stock.

A still further specific object is to provide a tire having a body of a diene rubber stock and a sidewall of a diisocyanate-polyester rubber.

Figure 1:
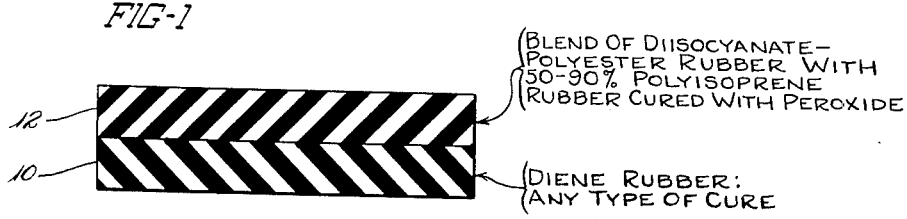
Figure 2:
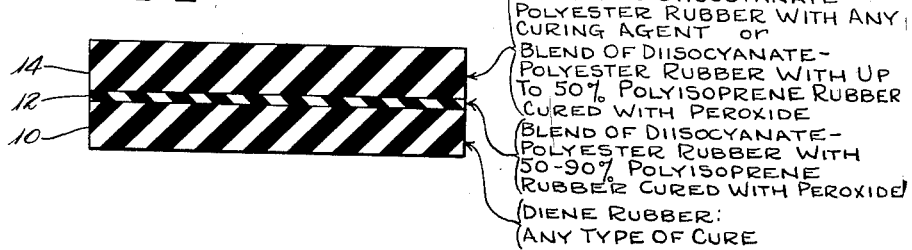
Figure 3:
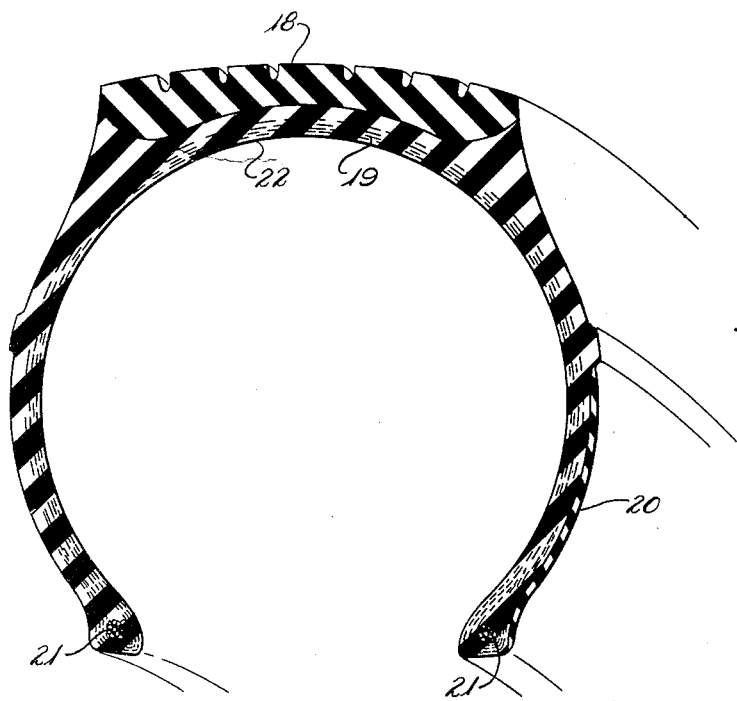

The invention will be described in connection with the attached drawing wherein:

FIG. 1 is a cross-section of a laminated product in accordance with this invention, FIG. 2 is a cross-section of a modified laminated product in accordance with this invention, and FIG. 3 is a perspective view, partly in section, of a tire having a sidewall and a tread ply laminated thereto in accordance with this invention.

SYNOPSIS OF THE INVENTION

The above and other objects are secured, in accordance with this invention, in a cured laminate shown in FIG. 1 as comprising a lamina 10 of a natural or synthetic diene rubber stock adhered to a lamina 12 of a stock which is a blend of (1) a diisocyanate-polyester rubber with at least 50% of (2) a natural or synthetic polyisoprene rubber, the percentage being based on the sum of the weight of constituents (1) and (2), and the lamina 12 being cured by means of an organic peroxide. Optionally, as shown in FIG. 2, the laminate may comprise, in addition to the laminae 10 and 12, a third lamina 14 of a stock containing unblended diisocyanate-polyester rubber, or a blend of diisocyanate-polyester rubber with up to 50% of a polyisoprene rubber, based on the weight of diisocyanate-polyester rubber and polyisoprene rubber, said lamina 14 being adhered to the lamina 10 by the intermediate lamina 12. The lamina 14 may contain, as a curing agent, either an organic peroxide such as used for lamina 12 or any other curing agent for diisocyanate-polyester rubbers. The products are produced by laying up, in uncured state, the laminae 10, 12 and, optionally 14, and heating them in contact under the pressures, and at the temperatures, usual in the molding and curing of elastomeric products.

THE DIENE RUBBER STOCKS IN THE LAMINA 10

The diene rubbers forming the basis of these stocks may be any of the rubbers which are essentially polymers of dienes such as isoprene, butadiene, 2,3-dimethylbutadiene, piperylene, and the like. For instance, the rubber may be a natural polyisoprene such as Hevea rubber. Alternatively, it may be a synthetic polymer or copolymer of butadiene, isoprene, 2,3-dimethylbutadiene, piperylene, conjugated dienes or mixtures of such dienes. In the case of the copolymers, the diene constituent should constitute at least 65% by weight of the copolymers. Comonomers which may be copolymerized with dienes to yield suitable diene rubbers, are ethylenically monounsaturated compounds such as styrene, alpha methyl styrene, nuclearly alkylated styrenes, acrylonitrile, methacrylonitrile, chloroacrylonitrile, acrylic and methacrylic esters such as methyl acrylate, ethyl acrylate, propyl acrylate and methyl methacrylate and the like. It is understood that a mixture of any of these compounds may also be used. It is also understood that a small amount, not greater than about 2% of ethylenically poly-unsaturated compounds, such as divinyl benzene, allyl acrylate or the like may also be used. For a more complete list of monomers known to copolymerize with dienes, reference is made to Krczil, Kurzes Handbuch der Polymerisationstechnik, Band II, Mehrstoffpolymerisation, Edwards Brothers Inc., 1945, pages 655, 656, 663, 682 and 710, the entries under "butadien," "2,3-dimethylbutadien," "isopren," and "piperylen."

The diene rubber stocks in the lamina 10 may contain any of the compounding agents, sulfur or other vulcanization agents, accelerators, carbon black, pigments, reinforcing agents, softeners and the like customarily used in the compounding of these types of rubber. These materials neither interfere with, nor are they adversely affected by, the peroxide curing agents in the blended diisocyanate-polyester rubber/polyisoprene rubber stocks of the lamina 12.

THE DIISOCYANATE-POLYESTER RUBBER STOCKS OF LAMINAE 12 AND 14

The diisocyanate-chain-extended polyester rubbers which are used in the stocks of these laminae in accordance with this invention are produced from relatively low molecular weight, subresinous, substantially saturated linear polyesters of dicarboxylic acids with dihydric alcohols. These relatively low-molecular-weight polyesters are then reacted with organic diisocyanates to chain-extend them to a molecular weight sufficiently high that the chain-extended products have a consistency resembling uncured natural rubber, being elastic but sufficiently plastic to be milled on roll mills, molded, extruded and otherwise processed similarly to natural rubber. In general, the amount of diisocyanate used, and the conditions of reaction should be such that the chain-extended product will have a Mooney Plasticity $ML_4$-212 of 10–250.

Referring more particularly to the polyesters prior to chain-extension, these are essentially linear polyesters of dicarboxylic acids with dihydric alcohols. The polymeric chains may, however, include a certain proportion, say up to 10% by weight of the polyester, of residues derived from other bi-functional ester-forming groups such as hydroxycarboxylic acids. Likewise, they may include very small amounts, say up to 2%, of tri- or higher poly-functional ester-forming compounds, these proportions being sufficiently small that the essentially linear character of the polyesters is not impaired. The polyesters are produced by heating the monomeric constituents together under the usual esterification conditions, and these conditions are maintained until the hydroxyl number of the polyester has been reduced to between 10 and 110, preferably between 18 and 60. The alcoholic constituents should be supplied in slight stoichiometric excess over the acid constituents, so that the end groups in the polyester chains will be largely hydroxyl rather than carboxylic acid groups. The amount of acids used, and the vigor and duration of the esterification conditions applied, should preferably be such that the acid number of the polyester does not exceed 2; this is not an essential limitation, if a certain amount of bubbling can be tolerated in the diisocyanate-chain-extension step, since the porosity can be milled out of the product before final curing. The sum of the hydroxyl and acid numbers, which will be denoted the "reactive number" should be between 10 and 110. Polycarboxylic acids adapted for the production of polyesters according to this invention include alkylene and other hydrocarbon-polycarboxylic acids, it being understood that the hydrocarbon radicals may be substituted or interrupted by non-interfering groups such as ether linkages, tertiary amino groups, halogen substituents, keto groups and the like. Suitable dicarboxylic acids are exemplified in malonic, succinic, glutaric, adipic, pimelic, suberic, azelaic, sebacic, brassylic, malic, diphenic, phthalic, tetrachlorophthalic, isophthalic, terephthalic, hexahydroterephthalic, p-phenylene diacetic, dihydromuconic, and beta methyl adipic acids. Suitable tri- and higher polycarboxylic acids (for use, as noted above, in minor proportions of less than 2%, in order to preserve the linear character of the polyesters) include for instance citric, aconitic, itaconic, citraconic and like acids. Polyhydric alcohols which may be used include polyhydroxylated aliphatic, aryl and other hydrocarbons, it being understood that the hydrocarbon radicals may be substituted or interrupted by non-interfering groups such as ether linkages, halogen substituents and the like. Suitable dihydric alcohols are exemplified in ethylene glycol, propylene-1,2-glycol, propylene-1,3-glycol, butylene-1,2-glycol, butane-1,4-diol, decamethylene glycol, dodecamethylene glycol, N,N-diethanolaniline, the monoethyl ether of glycerine, alpha- and beta-allyl ethers of glycerol, thiodiglycol and the like. Suitable tri- and higher polyhydric alcohols (to be used in minor proportions of less than 2%, in order to preserve the linear character of the polyesters) include glycerol, pentaerythritol, sorbitol, diglycerol and the like. The constituents of the esters should be largely aliphatic in character, so as to avoid unduly rigid products; not more than about 15% of the weight of these constituents should be aromatic compounds.

With regard to the chain-extension reaction, this is effected by compounding the polyester with an organic diisocyanate and heating the mixture at 250–300° F. Particularly good results are secured in the practice of this invention with polyesters which have been chain-extended by means of methylene diphenyl diisocyanate, which is a compound having the formula

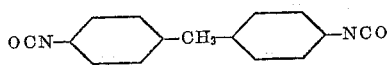

Alternatively, or in conjunction with the application of heat, the chain-extension reaction may be promoted by the addition of catalysts such as amines on the order of N,N-dimethyl aniline, tri-ethylamine, and the like. The amount of diisocyanate used should be sufficient to bring the Mooney Plasticity $ML_4$–212 of the chain-extended rubber to a value in the range 10–250. Generally about 6–20% of the diisocyanate, based on the weight of polyester, will be sufficient for this purpose. Other suitable diisocyanates include for example p-phenylene diisocyanate, methylene diphenyl diisocyanate, dianisidine diisocyanate, 4,4'-tolylidine diisocyanate, 1,5-napthalene diisocyanate, 4,4'-diphenyl ether diisocyanate, the toluene diisocyanates, hexamethylene diisocyanate, decamethylene diisocyanate, and the like.

With regard to the curing agents to be incorporated with the stock of the lamina 12 these will always be peroxide curing agents (as described hereinbelow) since peroxides are the only type of curing agents which will cure compositions containing both polyisoprene and diisocyanate-polyester rubbers. Peroxides must also be used in the stock of lamina 14 if that lamina contains any polyisoprene rubber. If the lamina 14 is an unblended diisocyanate-polyester rubber stock, either peroxides or any other curing agents such as additional polyisocyanates may be used in this lamina.

THE POLYISOPRENE RUBBERS OF LAMINAE 12 AND (OPTIONALLY) 14

Suitable polyisoprene rubbers for use in this invention include any natural or synthetic polymers of isoprene, preferably such as have the double bonds largely in the cis-configuration such as natural Hevea rubber, guayule rubber, castilloa rubber and the like. Likewise suitable are the synthetic polyisoprenes produced either by free radical or ionic catalytic polymerization of isoprene. It will be understood that the synthetic polyisoprenes will often have minor proportions, say up to about 25% based on the weight of the rubber, of other unsaturated compounds copolymerized therein, examples of such copolymerized compounds being styrene, acrylonitrile, acrylic and methacrylic esters and the like. All of these natural and synthetic polymers and copolymers of isoprene will be referred to hereinafter, for brevity, as "polyisoprene rubbers."

THE PEROXIDE CURING AGENTS

Any organic peroxide compounds may be used in the blended stock of the lamina 12 of this invention, provided that they are sufficiently stable to be compounded with the blends and are physically compatible therewith. Suitable organic peroxide compounds include, for instance, benzoyl peroxide, ascaridole, t-butyl hydroperoxide, di-t-butyl peroxide, t-butyl perbenzoate, perbenzoic acid, lauroyl peroxide, cyclohexanone hydroperoxide, tetrachlorobenzoyl peroxide and the like. Particularly good results are obtained by the use of dicumyl peroxide. This peroxide produces cured products having much higher tensile strength and elongations with any given diisocyanate-polyester rubber-containing blend than any other peroxidic compound tested to date; and still more particularly, when the 4,4'-methylene diphenyl diisocyanate is used to chain-extend the polyester, truly outstanding physical properties are achieved, often doubling the values observed with other peroxides and isocyanates. The peroxides are employed in amounts from 0.5 to 5.0%, based on the total weight of polyisoprene and polyester-diisocyanate rubber present. Curing is at 275° to 350° F. for 10 to 120 minutes.

With the foregoing general discussion in mind, there are given herewith detailed examples of the practice of this invention. All parts given are by weight.

PREPARATION OF POLYESTER RUBBER

A. Preparation of polyester:

| | Kilograms |
|---|---|
| Adipic acid | 11.68 |
| Ethylene glycol | 4.08 |
| Propylene glycol | 2.14 |

The above ingredients were charged into a reaction vessel provided with a heating jacket, a take-off condenser, a vacuum connection, and a sparger for injecting nitrogen into the reaction mass in the vessel. Heat was applied, nitrogen was bubbled through the mass, and the temperature raised to 210° C. over a period of 72 hours. A total of 3018 ml. of distillate $nD^{20}$ 1.3569 was removed during this preliminary esterification, and at this point the reaction mass had an acid number of 4.5. Vacuum was then applied, and heating continued at 210° C. for an additional 24 hours, during which time an additional 420 ml. of distillate came over. The reaction mass was then cooled to 25° C. The polyester had an acid number of 0.43 and a hydroxyl number of 47.0.

B. Chain extension:

| | Kilograms |
|---|---|
| Polyester (prepared as just described) | 9.08 |
| Methylene diphenyl diisocyanate | 1.03 |

The above ingredients were mixed together and heated at 140° C. for 18 hours. The product has a Mooney plasticity $ML_4$–212 value of 86.0.

Example I.—Adhesion to tire body stock

Stock No. 1:

| | Parts |
|---|---|
| Pale crepe rubber | 75 |
| Polyester rubber (prepared as just described) | 25 |
| Magnesium-stearate | 0.5 |
| Dicumyl peroxide | 2.0 |
| Titanium dioxide | 30.0 |
| Silica pigment | 30.0 |
| Ultramarine blue | 0.2 |

The above ingredients were mill-mixed and sheeted out to a thickness of 0.125 inch. This sheet was laid up with a conventional automobile tire body stock containing conventional sulfur cure ingredients and the composite was molded 45 minutes at 300° F. The cured product showed excellent adhesion of the Hevea/polyester rubber stock to the conventional tire body stock.

Example II.—White stock—variable proportions and cures

Two stocks were milled together from ingredients as listed below in Table I. Mooney scorch times at 270° F. were determined on the uncured stocks. Likewise slabs of the stocks were cured at 325° F. for periods of 15, 25 and 35 minutes, and the properties determined on the resulting cured products. Set forth in Table I below are the results of these tests.

TABLE I

| | Stock No. 2 | Stock No. 3 |
|---|---|---|
| Ingredients: | | |
| Hevea Rubber | 61.7 | 92.5 |
| Polyester Rubber (Prepared as just described) | 61.0 | 30.5 |
| Dicumyl peroxide | 2.45 | 2.45 |
| Silica Pigment | 36.8 | 38.9 |
| Clay | | |
| Titanium Dioxide | 36.8 | 36.9 |
| Wax | | |
| Zinc Oxide | | |
| Ultramarine Blue | 0.3 | 0.3 |
| Magnesium Stearate | 1.22 | 0.61 |
| Mooney Scorch Value (min.) | 6 | 7 |
| Properties Immediately After Curing: | | |
| Modulus of Elasticity at 400% Elongation— | | |
| 15 min. cure | 1,450 | 1,725 |
| 25 min. cure | 1,550 | 1,900 |
| 35 min. cure | 1,500 | 1,900 |
| Tensile Strength (Lbs. per sq. inch)— | | |
| 15 min. cure | 2,625 | 2,800 |
| 25 min. cure | 2,500 | 2,525 |
| 35 min. cure | 2,200 | 2,325 |
| Elongation at Break (percent)— | | |
| 15 min. cure | 520 | 510 |
| 25 min. cure | 490 | 460 |
| 35 min. cure | 470 | 450 |

Slabs of each of the above stocks were cured in contact with a conventional Hevea rubber tire body stock containing sulfur cure and acceleration ingredients, the cure being at 300° F. for 60 minutes. Excellent adhesion of the blended stock of this invention to the conventional Hevea rubber body stock was obtained in each case.

Example III.—Black stock

| | Parts |
|---|---|
| Hevea rubber | 50 |
| Polyester rubber (prepared as described above) | 50 |
| Magnesium stearate | 2.0 |
| Carbon black ("Philblack O" an HAF black manufactured by Phillips Petroleum) | 40 |
| Dicumyl peroxide | 1.8 |

The above ingredients were mill-mixed, sheeted out and cured in contact with a tire body stock as described in Example I. The cured product showed excellent adhesion of the two laminae.

Example IV.—Composite tires

Three four-ply 6:70 x 15 tires were made up, using the same cord construction and tire mold, for comparing the performance of composite tires according to this invention with conventional tires. Referring to FIG. 3, tire No. 1 was made with a tread 18 of the stock of Example III, a sidewall 20 of stock No. 2 of Example II, and a body 22 of a conventional sulfur cured GR–S formulation. The body 22 contained four conventional plies of nylon cord and conventional bead wires 21. Tire No. 2 was exactly the same as tire No. 1, except that stock No. 3 of Example II was used for the sidewall 20. Tire No. 3 was a regular commercial white sidewall tire with a body 22 and tread 18 of GR–S stock and a white sidewall 20 of a conventional Hevea white sidewall stock. On road testing, the treads of tires Nos. 1 and 2 showed distinctly superior wear as compared with the conventional tire No. 3.

All of the tires were subjected to a scuff test, in which the tire under test is mounted on the right rear wheel of a 1955 Ford, which is then driven 100 revolutions against a 10-inch high concrete curb having a radius of 50 feet, the right front wheel of the car being kept in contact with the curb at all times. The tires were then visually examined, and rated for scuff-resistance on the basis of any blurring, cutting or chunking out of the lettering and any roughening of the general surface of the sidewall. Tire No. 2 was rated best, tire No. 1 was rated second best, with the conventional tire No. 3 a poor third. After the test, the dirt on the tires from the scuff test was cleaned off with scouring powder, and the tires rated for each and completeness of cleaning. Tire No. 1 was best, tire No. 2 second best and conventional tire No. 3 was poorest.

From the foregoing general description and detailed specific examples, it will be seen that this invention provides novel and heretofore unachieved laminated products combining the advantageous features of the polyester rubbers and the diene rubbers. The manufacture of the products is simple, readily controlled, and consistently reproducible, and the materials employed are cheap and readily available.

This application is a continuation-in-part of applications Serial Nos. 505,057; 505,058 and 505,059, all filed April 29, 1955.

What is claimed is:

1. A laminate comprising (A) a diene rubber stock cured and adhered to (B) a stock comprising a blend of (1) a diisocyanate-chain-extended polyester rubber with (2) an isoprene rubber, said stock (B) containing from 50% to 75% of isoprene rubber, based on the weight of polyester rubber and isoprene rubber therein, and being cured by an organic peroxide curing agent.

2. A laminate comprising (A) a diene rubber stock cured and adhered to (B) a stock comprising a blend of (1) a diisocyanate-chain-extended polyester rubber with (2) an isoprene rubber, said stock (B) containing from 50% to 75% of isoprene rubber based on the weight of polyester rubber and isoprene rubber therein and being cured by an organic peroxide curing agent, and (C) a stock selected from the group consisting of diisocyanate-chain-extended polyester rubbers and blends of diisocyanate-chain-extended polyester rubbers with isoprene rubbers containing up to 50% of isoprene rubbers said stock (C) being cured by an organic peroxide curing agent and being adhered to said stock (B).

3. A laminate comprising (A) a Hevea rubber stock cured and adhered to (B) a stock comprising a blend of (1) a diisocyanate-chain-extended polyester rubber with (2) Hevea rubber, said stock (B) containing from 50% to 75% Hevea rubber based on the weight of polyester rubber and Hevea rubber therein and being cured by dicumyl peroxide.

4. A laminate comprising (A) a diene rubber stock cured and adhered to (B) a stock comprising a blend of (1) a methylene diphenyl diisocyanate-chain-extended polyester rubber with (2) Hevea rubber, said stock (B) containing from 50% to 75% Hevea rubber based on the weight of polyester rubber and Hevea rubber therein and being cured by dicumyl peroxide.

5. A tire comprising a body (A) of a diene rubber adhered to (B) a tread comprising a blend of (1) a methylene diphenyl diisocyanate-chain-extended polyester rubber with (2) Hevea rubber, said tread (B) containing from 50% to 75% of Hevea rubber based on the weight of polyester rubber and Hevea rubber therein and being cured by dicumyl peroxide.

6. A tire comprising a body (A) of a diene rubber adhered to (B) a sidewall comprising a blend of (1) a methylene diphenyl diisocyanate-chain-extended polyester rubber with (2) Hevea rubber, said sidewall (B) containing from 50% to 75% of Hevea rubber based on the weight of polyester rubber and Hevea rubber therein and being cured by dicumyl peroxide.

7. Process which comprises laminating together and heating at curing temperatures (A) a diene rubber stock containing curing agents therefor with (B) a blend of (1) a diisocyanate-chain-extended polyester rubber with (2) an isoprene rubber, said stock (B) containing from 50% to 75% of isoprene rubber based on the weight of polyester rubber and isoprene rubber, said stock (B) further containing an organic peroxide as a curing agent.

8. A laminate comprising (A) a Hevea rubber stock cured and adhered to (B) a stock comprising a blend of (1) a diisocyanate-chain-extended polyester rubber with (2) Hevea rubber, said stock (B) containing 50% to 75% of Hevea rubber based on the weight of polyester rubber and Hevea rubber therein and being cured by an organic peroxide curing agent, and (C) a diisocyanate-chain-extended polyester rubber stock cured by an organic peroxide curing agent and adhered to the stock (B).

9. Process which comprises laminating together, superposed in the order named, and heating at curing temperatures (A) a Hevea rubber stock containing curing agents therefor (B) a blend of (1) a diisocyanate-chain-extended polyester rubber with (2) Hevea rubber, said stock (B) containing 50% to 75% of Hevea rubber, based on the weight of polyester rubber and Hevea rubber therein, and containing an organic peroxide as a curing agent, and (C) a diisocyanate-chain-extended polyester rubber stock containing an organic peroxide as a curing agent.

References Cited in the file of this patent

UNITED STATES PATENTS

| | | |
|---|---|---|
| 2,431,921 | Cook et al. | Dec. 2, 1947 |
| 2,467,322 | Lightbown | Apr. 12, 1949 |
| 2,625,535 | Mastin et al. | Jan. 13, 1953 |
| 2,713,884 | Schwartz | July 26, 1955 |
| 2,742,942 | Owen | Apr. 24, 1956 |
| 2,749,960 | Schwartz | June 12, 1956 |

FOREIGN PATENTS

| | | |
|---|---|---|
| 573,811 | Great Britain | Dec. 7, 1945 |

OTHER REFERENCES

Chemical and Engineering News, vol. 33, No. 20, May 16, 1955, page 2079.